US012786844B2

(12) United States Patent
Mitrovic et al.

(10) Patent No.: US 12,786,844 B2
(45) Date of Patent: Nov. 3, 2026

(54) SYSTEM AND METHOD OF ROUTING TRAFFIC FOR A CLUSTER OF DEVICES SERVICED BY A BASE STATION

(71) Applicant: Cisco Technology, Inc., San Jose, CA (US)

(72) Inventors: Snezana Mitrovic, Bertem (BE); Alwin Xavier Pulikkal Xavier, Tienen (BE); Vinay Saini, Bangalore (IN); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 356 days.

(21) Appl. No.: 18/653,648

(22) Filed: May 2, 2024

(65) Prior Publication Data

US 2025/0344129 A1 Nov. 6, 2025

(51) Int. Cl.
*H04W 40/24* (2009.01)
*H04W 8/22* (2009.01)
*H04W 60/04* (2009.01)

(52) U.S. Cl.
CPC ........... *H04W 40/248* (2013.01); *H04W 8/22* (2013.01); *H04W 60/04* (2013.01)

(58) Field of Classification Search
CPC ...... H04W 40/248; H04W 8/22; H04W 60/04
See application file for complete search history.

(56) References Cited

U.S. PATENT DOCUMENTS

2015/0131475 A1 5/2015 Van Phan et al.
2019/0387401 A1 12/2019 Liao et al.
2022/0272775 A1 8/2022 Sevindik
2024/0022993 A1 1/2024 Xu et al.
2024/0422621 A1* 12/2024 Rao ....................... H04L 65/403

FOREIGN PATENT DOCUMENTS

KR 20120080542 A 7/2012

* cited by examiner

*Primary Examiner* — Myron Wyche
(74) *Attorney, Agent, or Firm* — Polsinelli P.C.

(57) ABSTRACT

A device may receive, from an application function, a first machine-to-machine identifier at a first mobile device being served by a base station. A device may add the first machine-to-machine identifier to a user plane protocol stack of the first mobile device. A device may identify a second machine-to-machine identifier of a second mobile device served by the base station. A device may transmit, in connection with traffic from the first mobile device to the second mobile device, the second machine-to-machine identifier to the base station to enable local traffic routing through the base station to the second mobile device. The base station can notify a network node of the local traffic routing for charging purposes.

20 Claims, 15 Drawing Sheets

500

| | | | | | | | |
|---|---|---|---|---|---|---|---|
| UE NETWORK CAPABILITY IEI | | | | | | | |
| LENGTH OF UE NETWORK CAPABILITY CONTENTS | | | | | | | |
| EEA0 | EEA1 128 | EEA2 128 | EEA3 128 | EEA4 | EEA5 | EEA6 | EEA7 |
| EIA0 | EIA1 128 | EIA2 128 | EIA3 128 | EIA4 | EIA5 | EIA6 | EPS-UPIP |
| UEA0 | UEA1 | UEA2 | UEA3 | UEA4 | UEA5 | UEA6 | UEA7 |
| UCS2 | UIA1 | UIA2 | UIA3 | UIA4 | UIA5 | UIA6 | UIA7 |
| ProSedd | ProSe | H.245-ASH | ACCCSFB | LPP | LCS | 1xSR VCC | NF |
| ePCO | HC-CP CIoT | ERw/o PDN | S1-U data | UP CIoT | CP CIoT | Proserelay | ProSedc |
| 15 bearers | SGC | N1mode | DCNR | CP backoff | RestrictEC | V2X PC5 | multiple DRB |
| RPR | PIV | NCR | V2X NRPC5 | UPMTEDT | CPMTEDT | WUSA | RACS |
| | | | | | M2M | PTCC | PR |
| | | | | | | | |

502

FIG. 5

600

| IEI | INFORMATION ELEMENT | TYPE/REFERENCE | PRESENCE | FORMAT | LENGTH |
|---|---|---|---|---|---|
| 32 | M2M ROUTING SUPPORT | gNB SUPPORT FOR M2M ROUTING | O | TV | 1 |

602

| | | | | |
|---|---|---|---|---|
| M2M ROUTING SUPPORT INDICATION | SPARE | SPARE | SPARE | M2MSI |

FIG. 6

1000

| TYPE NAME | TYPE DEFINITION | DESCRIPTION | APPLICABILITY |
|---|---|---|---|
| srcM2M_ID | STRING | CONTAINS OWN M2M_ID OF IOT DEVICE | RAN BASED ROUTING |

1002

| TYPE NAME | TYPE DEFINITION | DESCRIPTION | APPLICABILITY |
|---|---|---|---|
| dstM2M_ID | STRING | CONTAINS M2M_ID OF DESTINATION IOT DEVICE | RAN BASED ROUTING |

1004

UL SDAP LAYER

| | | |
|---|---|---|
| D/C | R | QFI |

FIG. 10

SYSTEM AND METHOD OF ROUTING TRAFFIC FOR A CLUSTER OF DEVICES SERVICED BY A BASE STATION

FIELD OF THE INVENTION

The present disclosure relates to packet routing and more specifically to a new routing procedure for a cluster of devices serviced by a base station in which routing between the devices of the cluster of devices is handled by the base station and not a core network infrastructure. The routing can be called a "RAN" or radio-access network-based routing.

BACKGROUND

Latency and bandwidth are critical factors in critical/Industrial Internet-of-Things (IoT) devices and applications. These devices often use a communication protocol such as 5G of another 3GPP (3$^{rd}$ Generation Partnership Project) cellular technology. The 3GPP is an umbrella term for a number of standards organizations which develop protocols for mobile telecommunications. There are typically two types of communication used by Internet-of-Things (IoT) devices: Machine-to-Machine flows and Machine-to-Application server flows.

Given the mobile communication infrastructure, when a device communicates with another device through the mobile communication infrastructure, there are often latency issues and bandwidth constraints that may reduce the quality of service for a respective device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a table of information elements for the user equipment capability which includes the machine-to-machine capability added, in accordance with an aspect of this disclosure.

FIG. 6 illustrates example data structures for information elements related to machine-to-machine routing, in accordance with an aspect of this disclosure.

FIG. 10 illustrates data structures for a source machine-to-machine identifier and a destination machine-to-machine identifier, accordance with an aspect of this disclosure.

DETAILED DESCRIPTION

Overview

Figure 1:
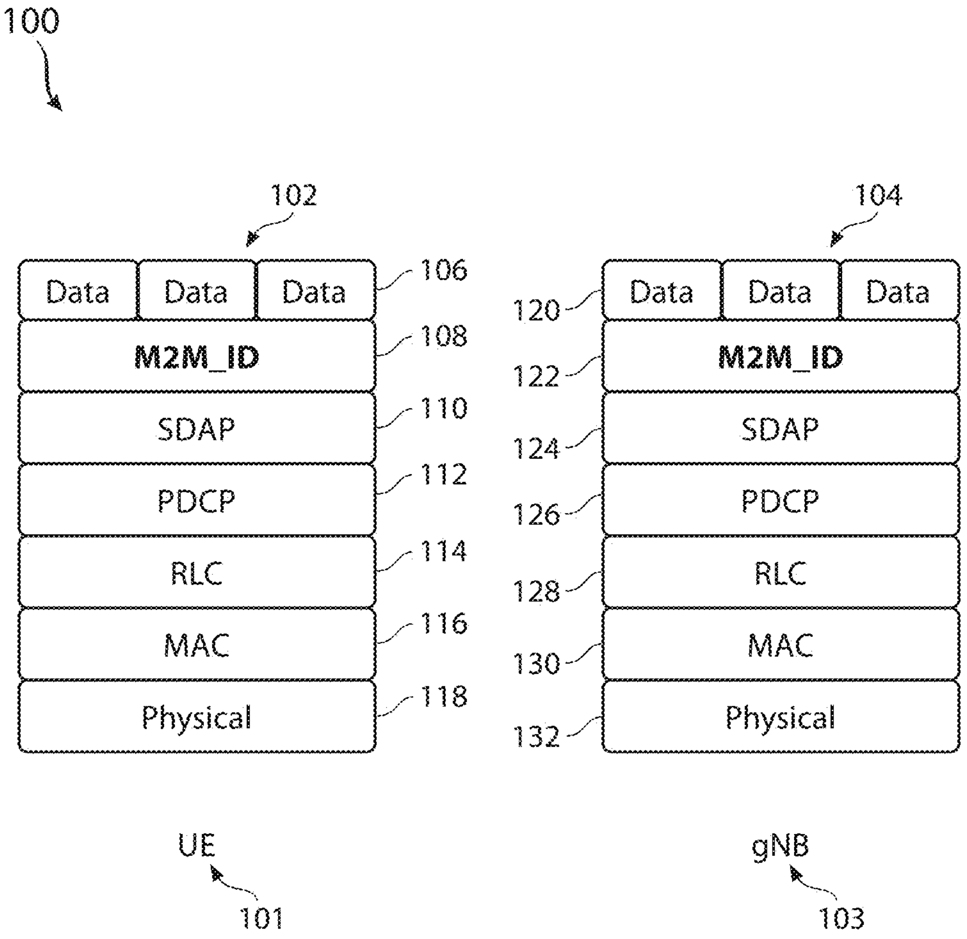
FIG. 1 illustrates a user plane protocol stack for a user equipment and a base station, in accordance with an aspect of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

As noted above, using the traditional mobile communication infrastructure can cause latency or bandwidth issues that can reduce the quality of service. Currently, 3GPP does not define the method to allow a base station such as a gNB (a next generation node B for 5G mobile communications or any base station) to route the traffic locally even if the IoT devices are within the same gNB coverage. As per the current implementation, if there is traffic between the two machines, that are served by the same access point and data network (as identified by an access point name and a data network name (APN/DNN)) and even under the same radio cell, the traffic will be sent to the core network or user plane function (UPF) over GTP-U or general packet radio service (GPRS) tunneling protocol which carries user data between a radio access network (the base station or gNB) and the core network. Reference to a gNB here can refer to any base station, access point or any device configured to enable wireless communication for more than one mobile device.

There are known concerns with radio access network (RAN)-based routing and the proposal disclosed herein that will address these concerns: The gNB cannot open the user packet so it cannot see the destination routing information. Charging for data usage can be a concern when one bypasses the core network for user traffic. Further, lawful intercept will be a concern when one bypasses the core network for user traffic.

This disclosure introduces an approach to routing traffic between devices covered in the same gNB in which the traffic is routed from a first device to the gNB and then directly routed to a second device within the service area of the gNB. The traffic is not routed to core network. The local routing concept can be referred to as RAN-based routing, machine-to-machine identifier-based routing (or M2M_ID-based routing) or some other characterization. In general, the routing of traffic is managed by a base station which, when the proper flag is set and/or other conditions are in place, the traffic between two devices is routed through the base station and not a core network node beyond the base station in the network. The base station can report the local routing of traffic for charging purposes of an AMF or access and mobility management function.

In some aspects, the techniques described herein relate to a method including: receiving, from an application function, a first machine-to-machine identifier at a first mobile device being served by a base station; adding the first machine-to-machine identifier to a user plane protocol stack of the first mobile device; identifying a second machine-to-machine identifier of a second mobile device served by the base station; and transmitting, in connection with traffic from the first mobile device to the second mobile device, the second machine-to-machine identifier to the base station to enable local traffic routing through the base station to the second mobile device.

In some aspects, the techniques described herein relate to a system for accessing local routing of traffic, the system including: at least one processor; and a computer-readable storage medium storing instructions which, when executed by the at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

In some aspects, the techniques described herein relate to a system for accessing local routing of traffic, the system including: means for receiving, from an application function, a first machine-to-machine identifier at a first mobile device being served by a base station; means for adding the first machine-to-machine identifier to a user plane protocol stack of the first mobile device; means for identifying a second machine-to-machine identifier of a second mobile device served by the base station; and means for transmitting, in connection with traffic from the first mobile device to the second mobile device, the second machine-to-machine identifier to the base station to enable local traffic routing through the base station to the second mobile device.

In some aspects, the techniques described herein relate to a computer-readable storage medium storing instructions which, when executed by at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

In some aspects, the techniques described herein relate to a method including: creating, via an application function, a cluster of devices under coverage area of a base station; assigning a respective identifier for each device of the cluster of devices; transmitting the respective identifier for each device to the cluster of devices so that each device of the cluster of devices learns the respective identifier for other devices of the cluster of devices; and routing traffic from a first device of the cluster of devices to a second device of the cluster of devices through the base station based on the respective identifier for each of the first device and the second device.

In some aspects, the techniques described herein relate to a system for providing local routing of traffic, the system including: at least one processor; and a computer-readable storage medium storing instructions which, when executed by the at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

In some aspects, the techniques described herein relate to a system for providing local routing of traffic, the system including: means for creating, via an application function, a cluster of devices under coverage area of a base station; means for assigning a respective identifier for each device of the cluster of devices; means for transmitting the respective identifier for each device to the cluster of devices so that each device of the cluster of devices learns the respective identifier for other devices of the cluster of devices; and means for routing traffic from a first device of the cluster of devices to a second device of the cluster of devices through the base station based on the respective identifier for each of the first device and the second device.

In some aspects, the techniques described herein relate to a computer-readable storage medium storing instructions which, when executed by at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

Example Embodiments

As noted above, the proposed solution described herein enables local routing of traffic between two devices that are each communicating with or in the coverage area a base station such as a gNB. Examples of such traffic can include any two or more devices in the coverage area of the base station and can include, but are not limited to, mobile devices, computers, non-mobile devices, Internet-of-Things devices such as robots, slow moving devices, vehicles, drones, devices in connection with production lines, mines, conveyer belts and so forth.

As noted above, there are latency issues with the traditional traffic routing approach. The proposed approach addresses these concerns by introducing RAN-based routing and also addresses issues where the base station cannot open a user packet so it cannot see the destination routing information. Other issues addressed include dealing with charging for data use where the approach bypasses the core network for user traffic. Further, the issue of how to handle a lawful intercept of the user traffic is also addressed as this will be a concern when the new local routing approach bypasses the core network for user traffic.

One example use case would be a warehouse or manufacturing facility which uses many robots or other devices which need to communicate with each other. A cluster of these devices can be created or identified, and each device can be assigned a machine-to-machine identifier and a flag can be set such that traffic between the devices can be handled at the base station (rather than other network routers, applications or other components of the network). To achieve this goal, changes can be made to the packet core policy function (PCF) of a network such as a 5G network and with the help of an application function, can create or identify a cluster of two or more devices under the same coverage of a base station such as a gNB. Each device is assigned a temporary machine-to-machine identifier (M2M_ID).

FIG. 1 illustrates a set of user plane protocol stacks 100 including a user equipment (UE) protocol stack 102 for a UE 101 that includes a data layer 106, and the new M2M_ID layer 108 that stores the M2M_ID. In FIG. 1, the UE 101 represents any device that can communicate wirelessly with the gNB or the base station 103 which can represent any base station, access point, or other type of device no matter what type of wireless communication protocol is used, such as 5G, 6G, WiFi, BlueTooth, near-field communication (NFC) and so forth. While the example wireless protocol is a 3GPP 5G or 6G protocol, any wireless protocol or network can utilize the principles disclosed herein.

Currently, the base station only sees up to the SDAP (Service Data Adaptation Protocol) layer (e.g., SDAP layer 110) and everything above the SDAP layer 110 is invisible to the base station. The base station 103 currently forwards the information associated with the layers above the SDAP layer 110. Other layers for the UE 101 include the PDCP (Packet Data Convergence Protocol) layer 112, the RLS (Radio Link Control) layer 114, the MAC (Medium Access Control) layer 116 and the Physical layer 118. The base station 103 (such as a gNB) includes corresponding layers in a new base station stack 104 as well including a data layer 120, a new M2M_ID layer 122, an SDAP layer 124, a PDCP layer 126, an RLC layer 128, a MAC layer 130 and a physical layer 132.

The approach is to utilize the new M2M_ID layer 108, 122 for local packet routing. The base station 103 can use embedded functionality already existing to extract data from the M2M_ID layer 108 and implement local routing. Alternatively, a packet interceptor function could be added to the base station 103 to intercept or to obtain, understand and implement local traffic routing at the base station 103. In one aspect, the M2M_ID layer 108, 122 that is added above the SDAP layer 110, 124 can include the M2M_ID for a destination device for traffic.

The M2M_ID can be temporarily assigned to the UE 101 and managed by a core network function such as an application function. Neighboring devices (i.e., in the same industry site, plant, warehouse, store, etc.) can learn the nearby IoT device M2M_ID from the application function. A source device that transmits traffic destined for a destination device can include the M2M_ID (of one or more of the source device and the destination device) when routing the traffic to the destination device. The gNB or the base station 103 uses the M2M_ID (again, of one or more of the source device and the destination device) to route the traffic to the destination device, as long as the devices remain in communication with the gNB or the base station 103.

One example of use could be a production line and scanner that performs defect analysis. The production line would send a picture to the scanner (in communication with the base station 103) directly, without going to the network UPF (User Plane Function) and back. In this manner, two devices can experience reduced latency and significantly improving performance as GTP encapsulation and de-encapsulation is not needed and traffic stays local. GTP stands for GPRS Tunneling Protocol which is an IP/UDP (Internet Protocol/User Datagram Protocol)-based protocol used in GSM (Global System for Mobile Communication), UMTS (Universal Mobile Telecommunications System) and LTE (Long-Term Evolution) core networks. It is used to encapsulate user data when passing the data through the core network and also carries bearer specific signaling traffic between core network entities.

Figure 2:
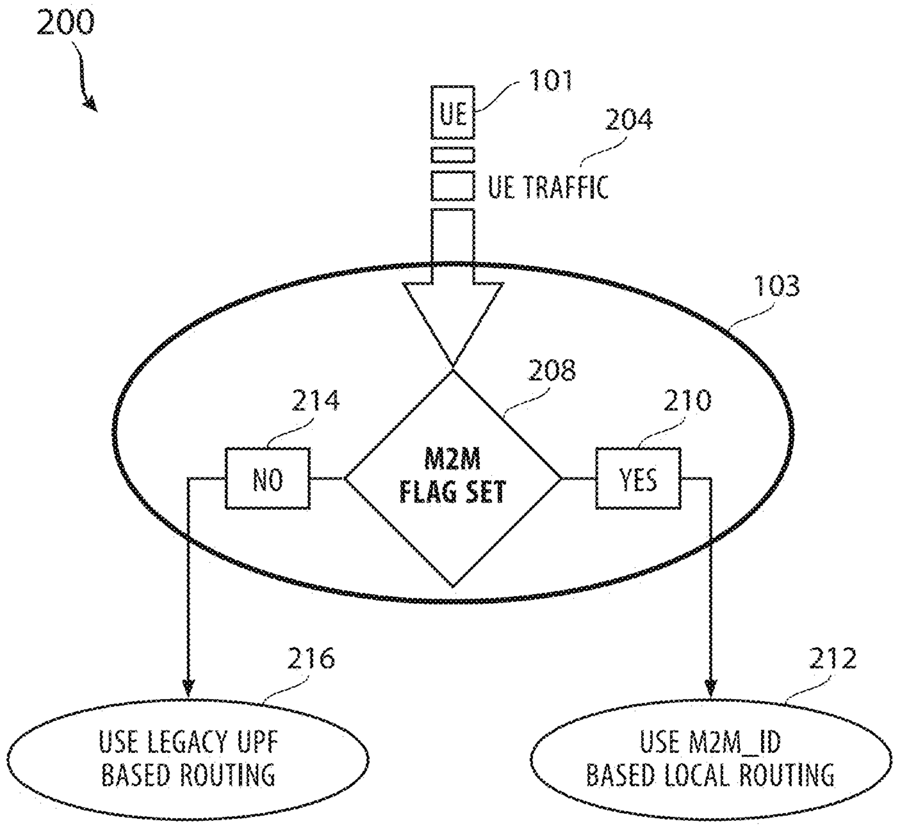
FIG. 2 illustrates the logic in connection with using a machine-to-machine flag set for determining whether to use local routing, in accordance with an aspect of this disclosure.

FIG. 2 illustrates the standard logic 200 for the new process. The UE 101 transmits UE traffic 204 to a base station 103. When the UE 101 is capable of machine-to-machine routing (i.e., can include the M2M_ID in its user plane protocol stack), then a flag is set and the base station 103 detects or identifies whether the M2M flag is set 208. If yes 210, then the base station 103 uses M2M_ID-based local routing 212. If the flag is not set 214, then the base station 103 uses legacy UPF-based routing 216. The UE 101 can therefore maintain the same legacy path (via GTPU/UPF) when M2M_ID-based local routing 212 is not available, such as when the other device does not have the capability or the programming to enable M2M_ID-based local routing 212.

A new signaling procedure is also added for charging or tracking the local routing traffic. When M2M_ID-based local routing 212 is used, then the base station 103 can transmit or report M2M data usage to a network node such as, for example, an SMF (Session Management Function), an AMF (Access and Mobility Management Function) or an AMF/SMF node.

Figure 3:
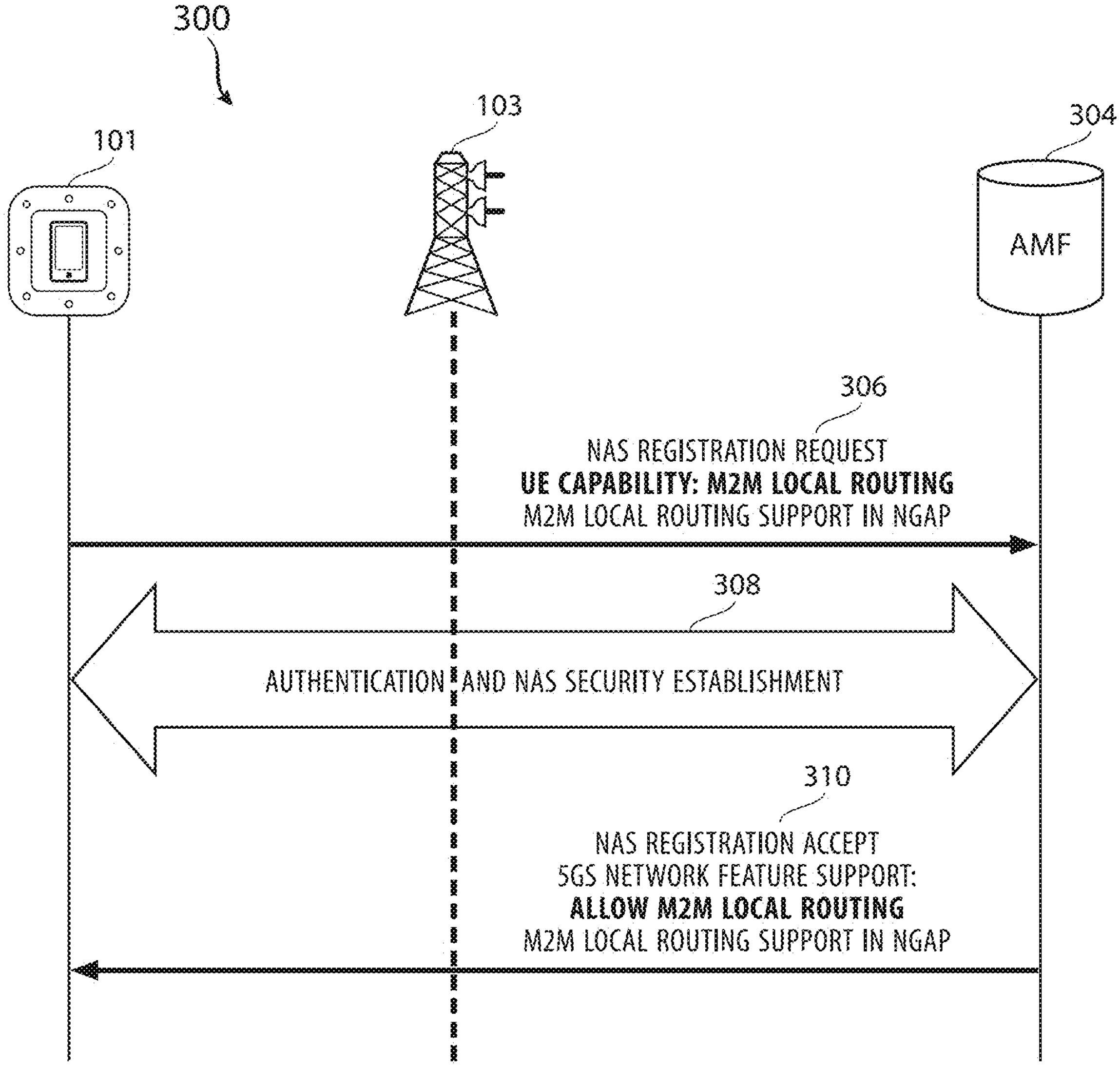
FIG. 3 illustrates the negotiation between the user equipment and the access and mobility management function for machine-to-machine local routing, in accordance with an aspect of this disclosure.

FIG. 3 illustrates a registration process 300 for establishing or enabling M2M_ID-based local routing 212. In a first step, the UE 101 transmits a NAS registration request 306 in which it reports to the AMF 304 that the UE 101 has the capability of M2M_ID-based local routing 212 or that the is M2M local routing support in the NGAP (Next-Generation Application Protocol). The NGAP is found on an N2 reference point between the base station 103 and the AMF 304.

The AMF 304 and the UE 101 then communicate to provide authentication and NAS security establishment 308 and the AMF 304 response with a NAS registration accept signal 310 which confirms, in another step, 5GS network features support to allow for M2M local routing and that there is M2M local routing support in the NGAP.

The UE 101 sends the NAS registration request 306 to the AMF 304 where the UE 101 include its RAN-based M2M routing feature support in the NAS UE capability layer as shown in FIG. 1. Once this is established, when messages arrive at the gNB or the base station 103, the gNB or the base station 103 will add an additional information element (IE) in the NGAP layer to advertise the gNB or base station support for M2M_ID-based local routing 212. The negotiation and new features that are introduced herein are in the control plane protocol stack.

Figure 4:
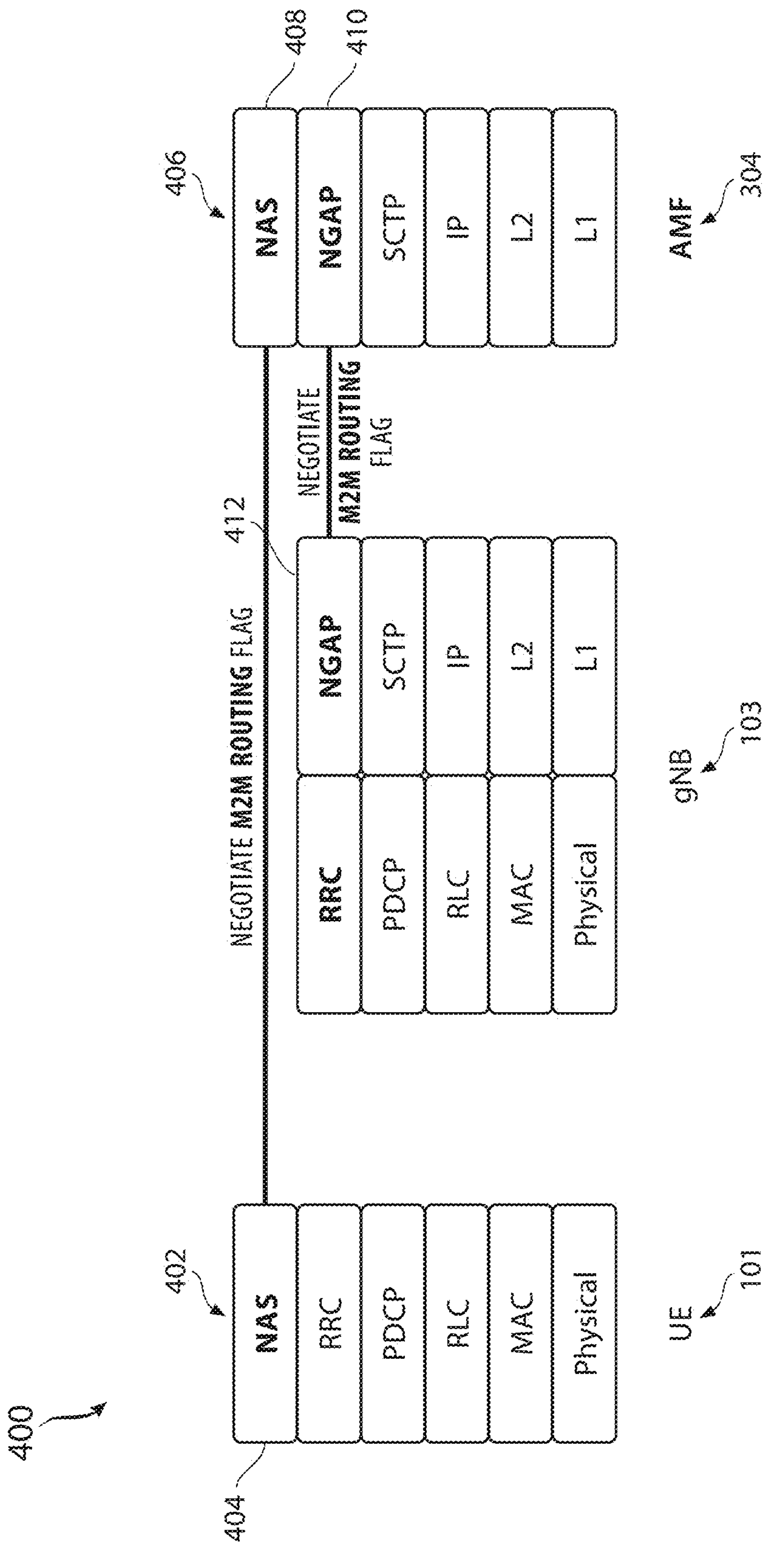
FIG. 4 illustrates the use of the NAS layer when negotiating between the user equipment and the access and mobility management function for machine-to-machine routing, in accordance with an aspect of this disclosure.

FIG. 4 illustrates the control plane protocol stack 400 that includes the UE stack 402 and the AMF stack 406. The AMF stack 406 can include a Non-Access Stratum (NAS) layer such as NAS layer 404. The NAS layer 404 on the UE stack 402 negotiates the setting of an M2M Routing Flag with the NAS layer 408 of the AMF stack 406. The two novel features of these protocol stacks include a new flag in UE capability in the NAS layer 404 to indicate UE capability regarding M2M_ID-based local routing 212. Another novel feature is a new IE in the NGAP layer 410 of the AMF 304 to indicate gNB support for the local routing feature. In 3GPP, the UE network capability is defined in TS 24.301, section 9.9.3.34, incorporated herein by reference. This disclosure adds a new flag "M2M" in UE network capability to indicate the UE's capability to support RAN-based routing or local routing as described herein. M2M routing flag can, in one example, the M2M can be binary and be set to either a "1" or "0". The bit indicates the UE support for M2M RAN-based. UE is capable in this case of adding the M2M_ID on the top of SDAP layer 110 whenever needed as shown in FIG. 1.

FIG. 5 illustrates an information element identifier (IEI) table 500 with various UE network capability information element identifiers. The NAS layer is invisible to the gNB or the base station 103 and thus a new IE (information element is added in the NGAP layer to indicate gNB support for RAN-based routing. With this NAS layer and NGAP novel IEs, the AMF 304 can understand the UE 101 and base station 103 capability to support the feature. The M2M information element identifier or the new IE 502 is shown where it can be added to this table.

A registration request message as introduced above has content defined in 3GPP TS 24.501 Table 8.2.6.1.1, incorporated herein by reference. FIG. 6 illustrates an example of the IEI message 600 that is numbered, by way of example, as IEI 32 with a definition of an "M2M Routing Support" as an IE and a type/reference as gNB support for M2M routing. The presence can be a "0" for no presence or a "1" indicating a presence of the feature. The format is "TV" and the length is one bit. The data may also vary from this structure such as being a two-bit length with more options related to RAN-based routing. Table 602 shows an M2M routing support indication, and some spare fields and an M2MSI or MSM support indicator field.

The new IE for advertising M2M routing support at the gNB is introduced. The IE has in one example a one-octet length. In an example structure, the first four bits represent the IE ID 32 to represent "M2M routing support indication" and out of the last 4 bits, the last bit can be used to represent the gNB support for M2M routing and can be called M2MSI (M2M support indicator) M2MSI I/O: By setting this flag indicate gNB support for the feature. Other structures for indicating such support can be provided as well.

Further, in the registration accept process, the AMF 304 can confirm 5G core support for the RAN-based routing in the NAS layer 404 for the UE 101 and the NAS layer 408 for the AMF 304. The AMF 304 can advertise the availability of the RAN-routing feature support in the NGAP layer 410, 412 to make sure the gNB or the base station 103 is aware of the capabilities. In some aspects, the registration and notification process can occur, for example, when a plurality of devices can utilize RAN-based routing. In may not make sense to establish the routing capabilities with only one device such as the UE 101 in the service area of a base station 103. Thus, the notification in the NGAP layer 410, 412 may occur only after multiple devices in the service are of a base station 103 have registered as being capable of RAN-based routing.

Thus, this disclosure introduces a new flag in a network which can be a 5GS (5G System) network feature support flag in the NAS layer 404 for the UE 101 and the NAS layer 408 for the AMF 304 to indicate that the network support the RAN-based routing. The core network can restrict/allow the M2M routing feature via the new flag in 5GS network feature support flag. The 5GS network feature support IE is defined in TS 24.501, section 9.11.3.5, incorporated herein by reference. The new flag indicates whether the network allows the feature. If the flag is a "restrict" flag, it may be called: "RestrictM2M" I/O. In this case, by setting the flag, the AMF 304 indicates that the core network will not allow (i.e., restrict) M2M RAN-based routing.

A new IE 502 is also introduced in the NGAP layer 410, 412 to inform the gNB or the base station 103 that network support for the feature. As noted above, the NAS layer 404 for the UE 101 and the NAS layer 408 for the AMF 304 is invisible to the gNB or the base station 103. Therefore, a new IE 502 is added in the NGAP layer 410, 412 to inform that there is 5G core feature support to the gNB or the base station 103. When RestrictM2M is not set (i.e., when the core network supports the feature), the AMF 304 will add the new IE (i.e., IEI 32 in IEI message 600) RAN-routing support in the NGAP layer 410, 412 so that the gNB or the base station 103 is aware of core capability of the M2M feature.

Figure 7:
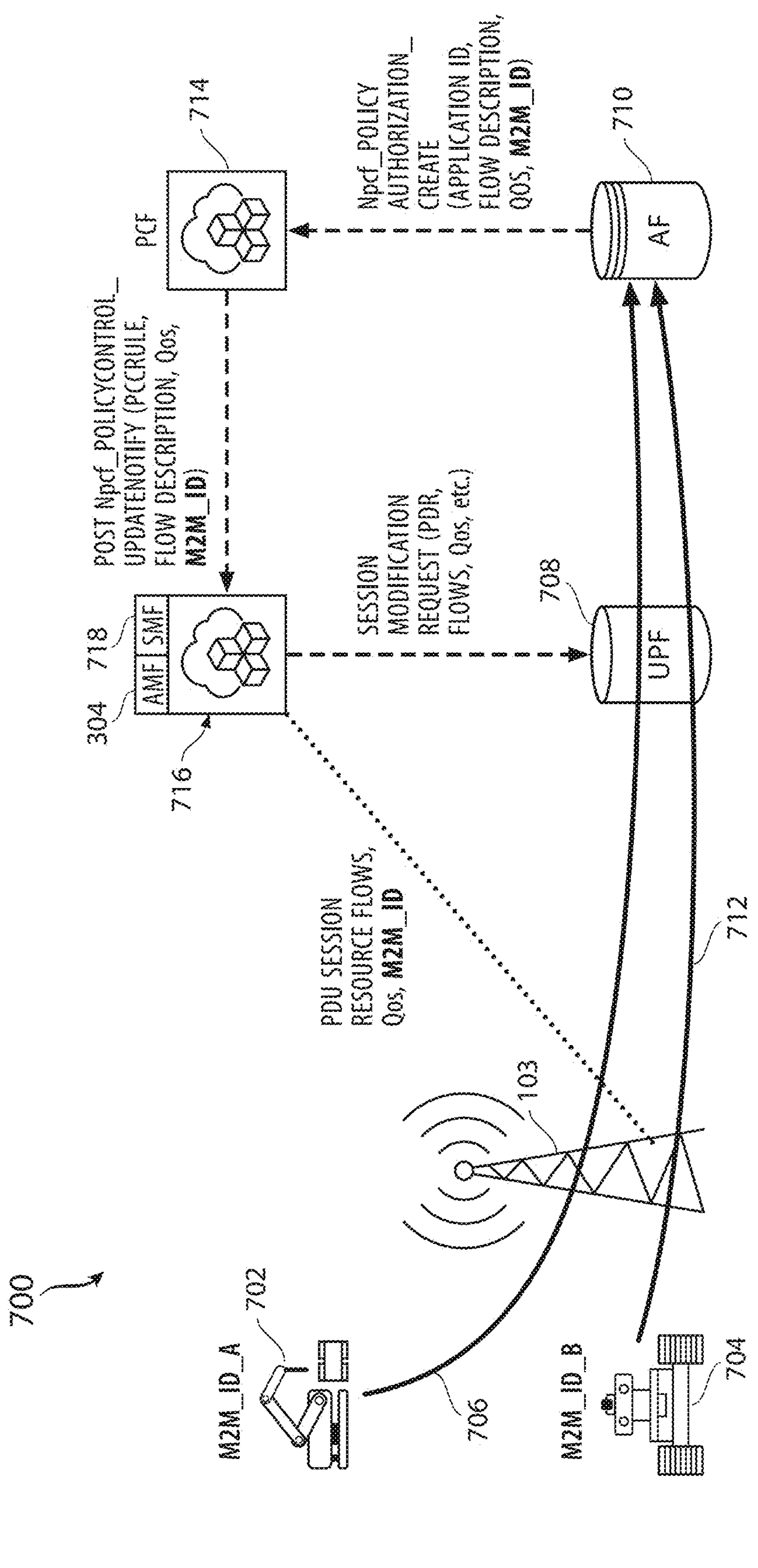
FIG. 7 illustrates an example series of steps that the network performs to enable machine-to-machine local routing, in accordance with an aspect of this disclosure.

FIG. 7 shows an example network 700 including a first device 702 and a second device 704 that are to communicate with each other. In one step, the first device 702 and/or the second device 704 connects (via connection 706 and/or connection 712, respectively) to an application function (AF) such as AF 710 over UPF 708 and using an established PDU (protocol data unit) session. The AF 710 using the location features groups the first device 702 and/or the second device 704 based on cell coverage. The AF 710 can thus be a network node that creates a cluster of devices such as the first device 702 and/or the second device 704. The cluster of devices are generally determined to each have the RAN-routing capability (with the proper flags set, etc.) and that are registered with the network. Two devices are shown but the principles apply to a cluster or group of devices that can be three or more. All the first device 702 and/or the second device 704 obtain IP connectivity and start to contact the AF 710 (for example, a centralized controller, V2X server, virtual reality (VR) servers, etc.). The first device 702 and/or the second device 704 can share the MAP location and cell details of the base station 103 to the AF 710 over the IP connectivity.

The AF 710 can then have the opportunity to group or cluster the first device 702 and/or the second device 704 based on the gNB cell coverage. The AF 710 can assign a unique M2M_ID for each of the first device 702 and/or the second device 704 inside same gNB coverage area.

In another step, the AF 710 allocates the unique M2M_ID generated for this purpose to each of the first device 702 and/or the second device 704 (and others if they exist) inside the same gNB or the base station 103 coverage area. Based on the cell ID and the M2M_ID received from the AF 710, each of the first device 702 and/or the second device 704 can identify its nearby devices. Each of the first device 702 and/or the second device 704 will have its own assigned M2M_ID and also be able to learn or obtain the other respective M2M_ID's for neighboring devices.

Another step can include the AF 710 providing a notice for authorization to create a policy that is transmitted to a policy control function (PCF) such as PCF 714. The structure can be similar to the following which includes the M2M_ID: Npcf_POLICY_AUTHORIZATION_CREATE (Application ID, flow description, QoS, M2M_ID). In one example, a network slice can be created and intended for use by the group of devices such as the first device 702 and/or the second device 704 and the AF 710 will create (through the function listed above) the QoS (quality of service) flows inside the existing PDU session. The result can be standard call flow but enhanced with the M2M_ID capability.

During call flow creation between the AF 710 and the PCF 714, the AF 710 uses the novel IE or the M2M_ID feature in the Npcf_POLICY_AUTHORIZATION_CREATE message.

The PCF 714 pushes the information about the M2M_ID to the SMF, and in turn from the SMF to the AMF 304 (generally represented as a network node 716 that can include the AMF 304 and an SMF 718 in FIG. 7) as part of standard core signaling or a session modify procedure). The general signaling previously existed but passing the M2M_ID IE is new.

The SMF can verify if the first device 702 and/or the second device 704 is lawful intercept activated and whether RAN (the base station 103) is not supporting RAN-based routing. If either of these two conditions is met, then the session modify procedure should be executed without using the M2M_ID and the normal traffic flow should be used.

Figure 8:
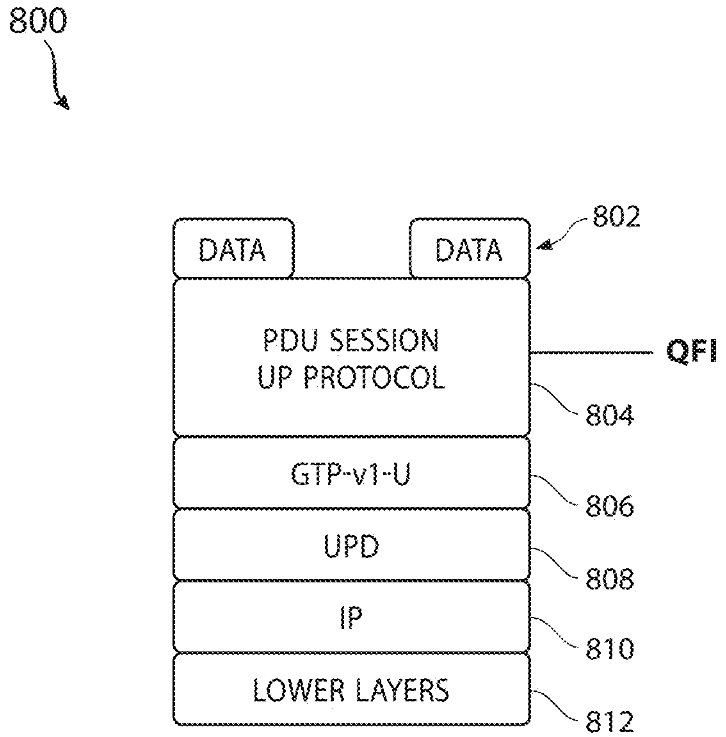
FIG. 8 illustrates protocol stack with a layer including a quality of service flow identifier, in accordance with an aspect of this disclosure.

At the end of this step, each of IoT devices is aware of their own M2M_ID and new traffic flow is created inside the GTP-U tunnel with AF-provided QFI (QOS flow identifier). The GTP-U tunnel is a used for carrying the GPRS core network data between the radio access network (i.e., including the base station 103) and the core network. FIG. 8 illustrates a protocol stack 800 that includes a data layer 802, QFI layer 804, a GTP-vi-U layer 806, a UPD layer 808, an IP layer 810 and lower layers 812.

Figure 9:
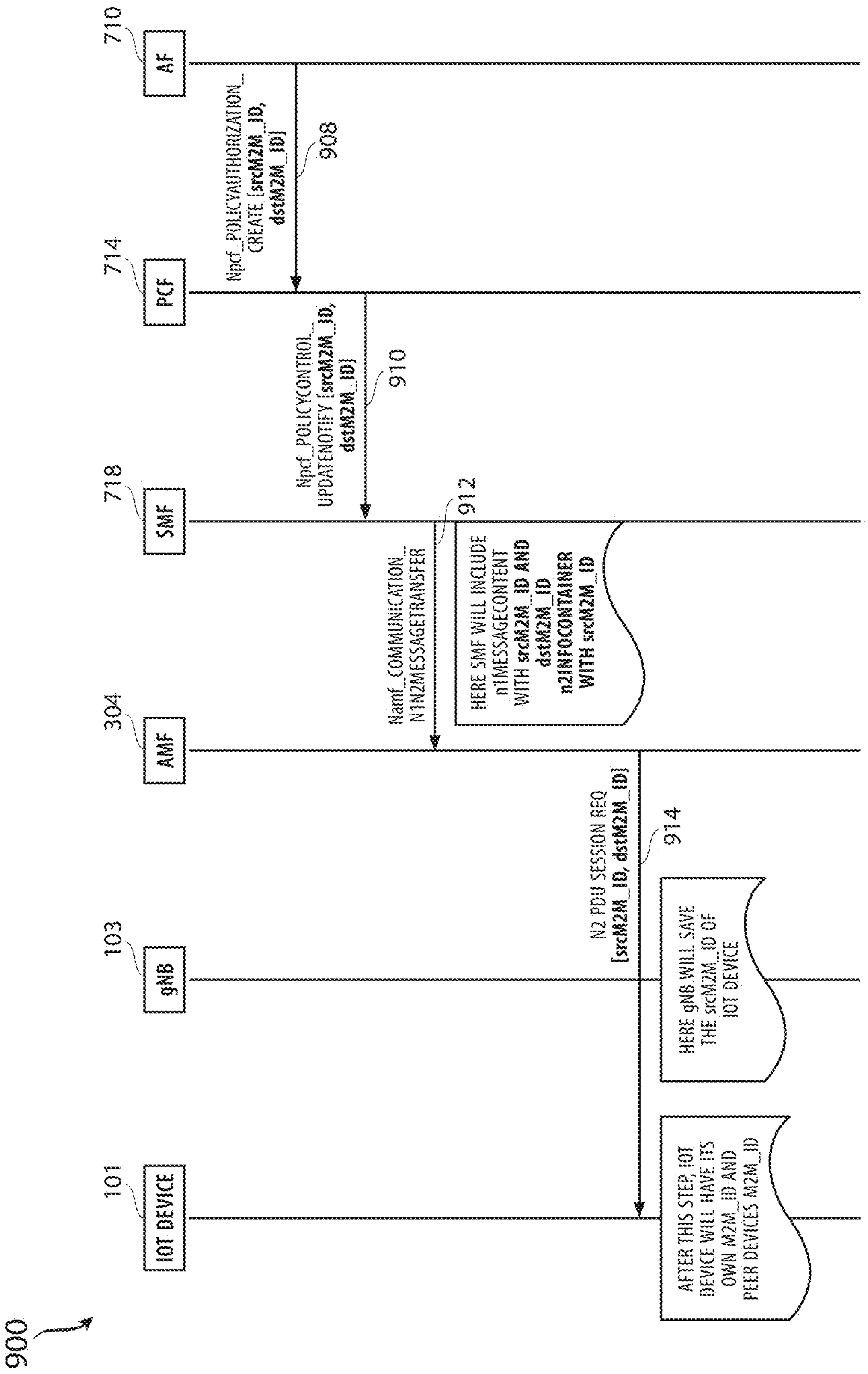
FIG. 9 illustrates signaling from an application function to a user equipment in connection with providing machine-to-machine local routing, in accordance with an aspect of this disclosure.

FIG. 9 illustrates a signal flow 900 between the device such as the UE 101 and the AF 710. In one example, assume that a first device 702 tries to connect to a second device 704. In this case, the AF 710 will send to the PCF 714 a novel IE (M2M_ID) in the Npcf_POLICYAUTHORIZATION_CREATE message 908 together with other information like flow description, Applicant ID, etc. Included as shown can be a source M2M_ID (srcM2M_ID) and a destination M2M_ID (dstM2M_ID). The PCF 714 can send a Npcf_PolicyControl_Update Notify message 910 with the srcM2M_ID and the dstM2M_ID. For reference, PolicyAuthorization specific data structure is defined in 3GPP TS 29.514, Table 5.6.1-1, incorporated herein by reference. This disclosure adds a new Data Type "src/dst M2M_ID". M2M_ID is the temporary ID allocated to each of the first device 702 and the second device 704 by the AF 710.

FIG. 10 illustrates a first table 1000 and a second table 1002 that include the proposed structure which references the srcM2M_ID and the dstM2M_ID, the types, description of what the data contains (i.e., the M2M_ID of the source device or the destination device) and applicability with respect to RAN-based routing.

The session modification procedure of FIG. 9 next creates at the PCF 714 a new PCC (policy and charging control) rule with an AF-provided flow description and QoS. The step here can follow the standard procedure, except that SMF 718 will include the novel IE M2M_ID in the N1 and N2 layer to deliver the M2M_ID to the first device 702 and the second device 704 and the gNB or the base station 103. The SMF 718 can include in its message 912 to the AMF 304 n1MessageContent with srcM2M_ID and dstM2M_ID n2InfoContainer with srcM2M_ID.

The message 914 transmitted from the AMF 304 can be provided to the gNB or the base station 103 and include an N2 PDU session request and the srcM2M_ID and the dstM2M_ID. The gNB or the base station 103 will save the srcM2M_ID of the first device 702 and after this step, the first device 702 and/or the second device 704 will have its own M2M_ID and the respective M2M_ID of peer devices.

Note that in some aspects, the M2M_ID will not share in the N4 interface. The SMF 718 can ignore the M2M_ID in a PDU session resource modify request if (1) the subscriber is lawful to intercept activated or (2) if the RAN does not support the M2M local routing. In essence, a new traffic flow is created inside the GTPU tunnel with AF-provided QFI via UPF.

In a next step, traffic starts to flow, and for traffic that is destined to a "peer" M2M device, there are two potential paths for that traffic. First, the traditional GTPU path (which may be required for handovers or other mobility scenarios) and the new novel path via the gNB or the base station 103 and bypassing core network. Via novel path, the first device 702 and/or the second device 704 can set the M2M flag in the SDAP layer 110, 124. In one aspect, the system can use the reserved bit in the SDAP layer 110, 124 for this purpose. Specifically, the source device or the first device 702 can add the destination device or the second device 704 M2M_ID above the SDAP layer in the M2M_ID layer 108 and/or the M2M_ID layer 122 as shown in FIG. 1.

When an uplink SDAP packet arrives, the packet will be more useful if the system specifics in a SDAP layer that above SDAP there is an M2M layer. Header 1004 illustrates an example specification that the M2M layer exists. Header 1004 shows a reserve bit R in the SDAP UL packet for such use. One advantage to this approach is that an IoT device can still be allowed to use a legacy path during M2M connection problem, even if the M2M capability is negotiated by IoT device. In a traditional use of the reserved bit, its value is 0 and can be ignored. According to this disclosure, what is introduced is the ability to negotiate the use of M2M capability by an IoT device. Then, the R bit can be used to track the presence of M2M layer above SDAP Uplink packet. This way, the IoT device can still use a backup UPF path if there is some problem with M2M routing.

Figure 11:
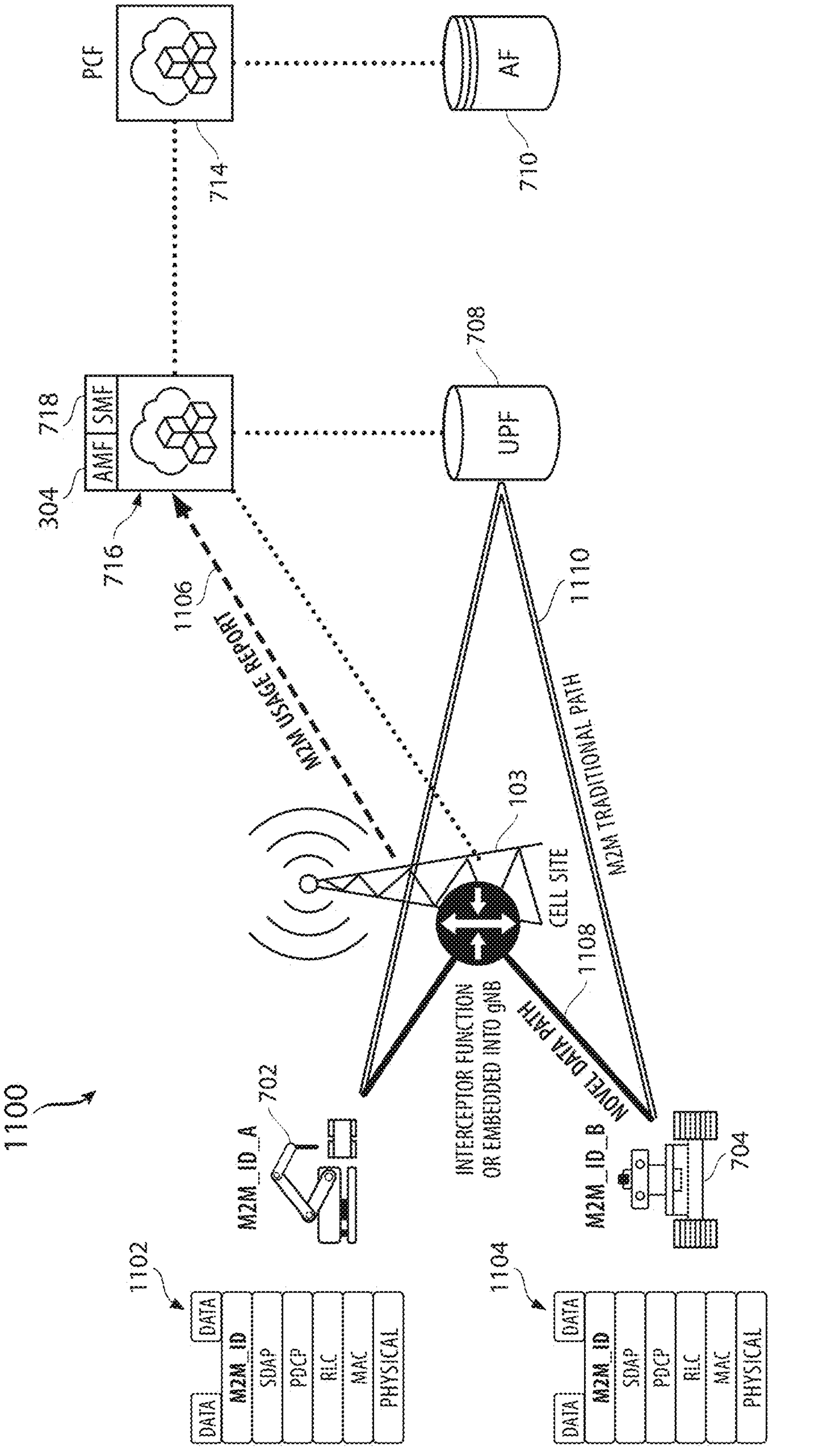
FIG. 11 illustrates a network showing how machine-to-machine local routing causes traffic flow to remain at the base station rather than the traditional path to the user plane function, in accordance with an aspect of this disclosure.

FIG. 11 illustrates a network 1100 that includes such features as a first device 702, a second device 704, a first protocol stack 1102 with the layer for the M2M_ID and a second protocol stack 1104 with the M2M_ID. As shown, when the configuration and the flags are set, then data from a first device 702 which can have an M2M ID of M2M_ID_A can communicate with the base station 103 or cell site. The base station 103 can include an interceptor function or functionality embedded into the gNB or the base station 103 can cause a change in the traffic path to the novel data path 1108 in which the base station 103 does not forward to the traffic back into the core network to other network nodes such as the UPF 708, which is the traditional data path 1110. The novel data path 1108 enables the first device 702 to be able to communicate with the second device 704 in a more efficient path with less latency than the traditional data path 1110.

As noted above, charging for data usage is important so another aspect of this disclosure is the M2M data usage report 1106 which can be provided to the network node 716 to enable the suer to be charged for the transmitted data.

Figure 12:
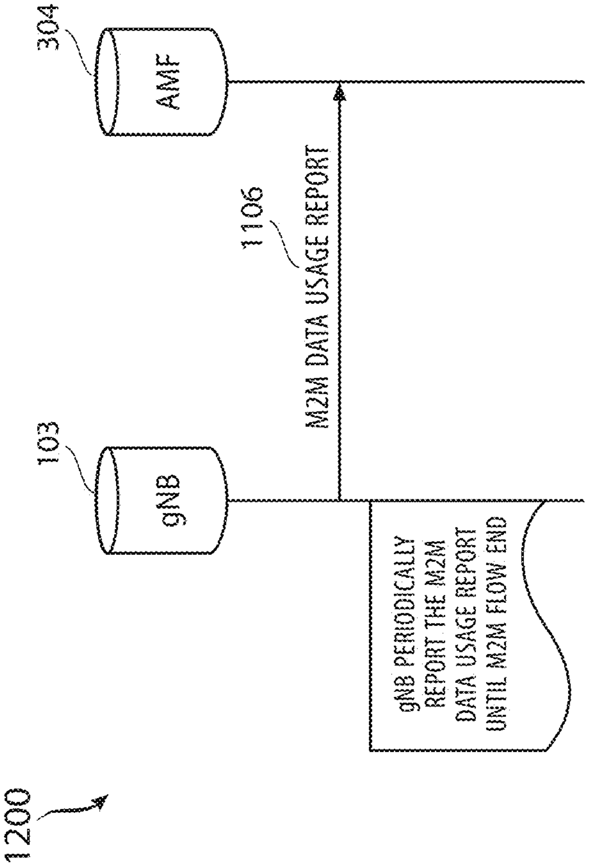
FIG. 12 illustrates the use of a data usage report, in accordance with an aspect of this disclosure.

FIG. 12 illustrates a reporting framework 1200 in which the gNB or the base station 103 will periodically report the M2M data suage until the M2M flow ends. The M2M data usage report 1106 is transmitted to the AMF 304.

Figure 13:
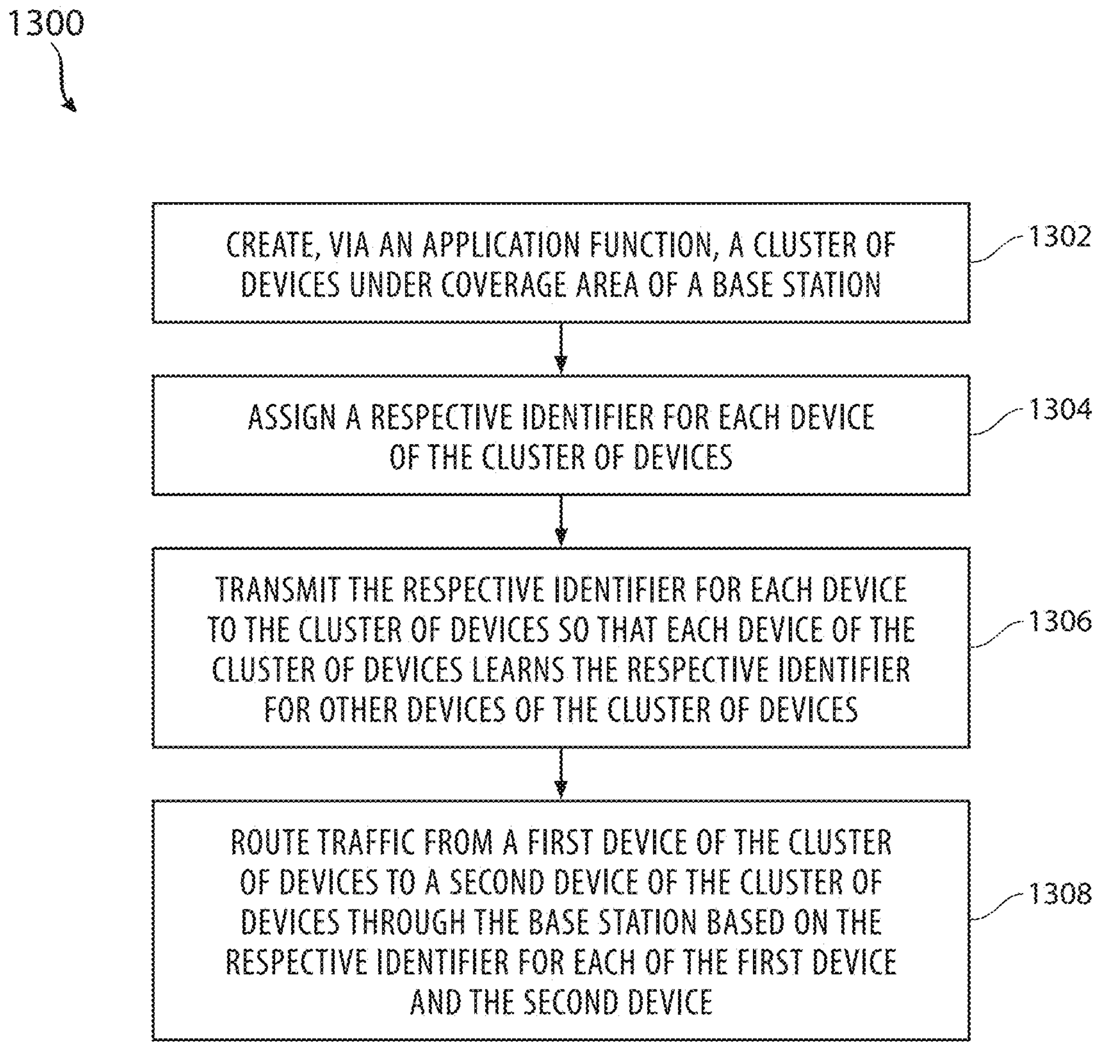
FIG. 13 illustrates an example method according to an aspect of this disclosure.

FIG. 13 is a flowchart illustrating a process 1300 for enabling a new traffic pattern or a RAN-based traffic flow. The process 1300 can be performed by one or more of a computing system 1500, a first device 702, a second device 704, a gNB or the base station 103, a UPF 708, an AF 710, a PCF 714, a network node 716 that can include the AMF 304 and the SMF 718, a core network node, and/or any combination thereof.

At block 1302, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does create, via an application function, a cluster of devices under coverage area of a base station. Each device of the cluster of devices can include an Internet-of-Things device.

At block 1304, the computing system (i.e., the computing system 1500, a first device 702, a second device 704, a gNB or a base station 103, a UPF 708, an AF 710, a PCF 714, a network node 716 that can include the AMF 304 and the SMF 718, a core network node, and/or any combination thereof) can and does assign a respective identifier for each device of the cluster of devices.

At block 1306, the computing system (i.e., the computing system 1500, a first device 702, a second device 704, a gNB or a base station 103, a UPF 708, an AF 710, a PCF 714, a network node 716 that can include the AMF 304 and the SMF 718, a core network node, and/or any combination thereof) can and does transmit the respective identifier for each device to the cluster of devices so that each device of the cluster of devices learns the respective identifier for other devices of the cluster of devices.

At block 1308, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does route traffic from a first device of the cluster of devices to a second device of the cluster of devices through the base station based on the respective identifier for each of the first device and the second device. The route can be a novel data path 1108 that does not pass through a user plane function (UPF) such as UPF 708 of a mobile core infrastructure system architecture.

In some aspects, the respective identifier can include a machine-to-machine identifier that is configured both in a respective first user plane protocol stack on each device and a second user plane protocol stack on the base station.

The process 1300 can further include the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) that can and does transmit a notice associated with the routing of the traffic to a network node for charging purposes. The notice can be the M2M data usage report 1106 shown in FIG. 11.

The application function (e.g., the AF 710) can include a core network function and the base station 103 can be a gNB or any other type of wireless communication device of various protocols.

In some aspects, the respective identifier can include a respective temporary identifier.

In some aspect, the process 1300 can further include the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) being configured to set a flag associated with machine-to-machine routing when assigning the respective identifier such that, when the flag associated with machine-to-machine routing is set, the computing system uses the respective identifier for local routing of traffic and, when the flag associated with machine-to-machine routing is not set, the computing system uses user plane function-based routing of the traffic.

In some aspect, the process 1300 can further include the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) being configured to receive a respective initial registration request from each device of the cluster of devices indicating that each device of the cluster of devices is capable of local routing through the base station. The respective initial registration request can be received at an access and mobility management function in a non-access stratum (NAS) layer.

In some aspects, a system for providing local routing of traffic can include at least one processor; and a computer-readable storage medium storing instructions which, when executed by the at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

In another aspect, a system for providing local routing of traffic can include one or more of: means for creating, via an application function, a cluster of devices under coverage area of a base station; means for assigning a respective identifier for each device of the cluster of devices; means for transmitting the respective identifier for each device to the cluster of devices so that each device of the cluster of devices learns the respective identifier for other devices of the cluster of devices; and means for routing traffic from a first device of the cluster of devices to a second device of the cluster of devices through the base station based on the respective identifier for each of the first device and the second device.

In some aspects, a computer-readable storage medium stores instructions which, when executed by at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

Figure 14:
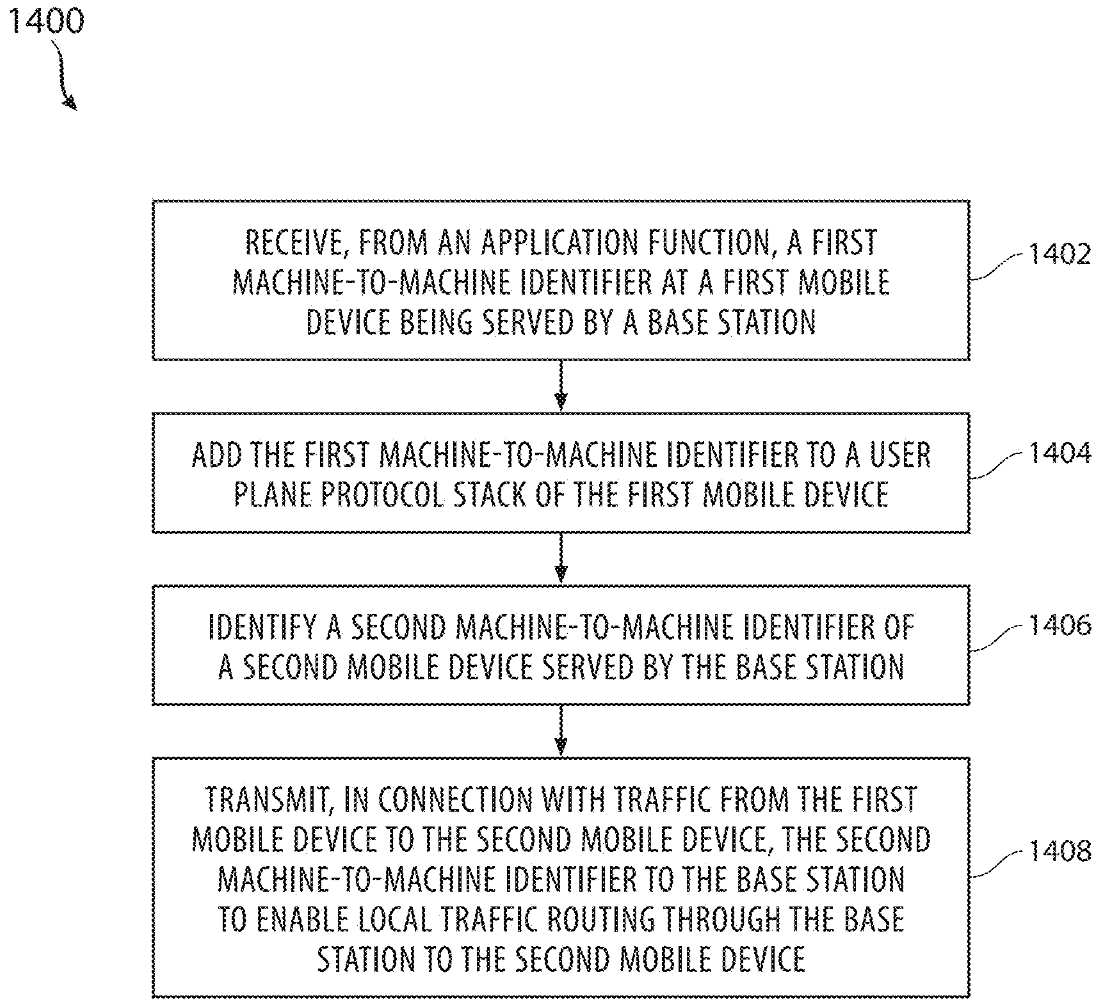
FIG. 14 illustrates an example method according to an aspect of this disclosure.

FIG. 14 is a flowchart illustrating a process 1400 for enabling a new traffic pattern or a RAN-based traffic flow. The process 1400 can be performed by one or more of a computing system 1500, a first device 702, a second device 704, a gNB or the base station 103, a UPF 708, an AF 710, a PCF 714, a network node 716 that can include the AMF 304 and the SMF 718, a core network node, and/or any combination thereof. The focus of FIG. 14 however is the processing from the standpoint of the first device 702 and/or the second device 704 which can be a user equipment (UE).

At block 1402, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does receive, from an application function, a first machine-to-machine identifier at a first mobile device being served by a base station.

At block 1404, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does add the first machine-to-machine identifier to a user plane protocol stack of the first mobile device.

At block 1406, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does identify a second machine-to-machine identifier of a second mobile device served by the base station.

At block 1408, the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) can and does transmit, in connection with traffic from the first mobile device to the second mobile device, the second machine-to-machine identifier to the base station to enable local traffic routing through the base station to the second mobile device.

The first machine-to-machine identifier and the second machine-to-machine identifier can both be temporarily assigned by the application function such as AF 710. The application function can include a core network function and manages use of the first machine-to-machine identifier and the second machine-to-machine identifier to enable local routing through the base station and not through a core network.

In some aspects, the first machine-to-machine identifier is configured both in a first user plane protocol stack on the first mobile device and a second user plane protocol stack on the base station.

In some aspects, the base station 103 transmits a notice regarding the use of local traffic routing from the base station to a network node for charging purposes. The transmission can be periodic or triggered based on a triggering event and can occur during the traffic flow from a first device 702 to a second device 704.

The application function can include a core network function and wherein the base station 103 comprises a gNB or some other wireless communication device of any protocol.

The process 1400 can further cause the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) to be configured to set a flag associated with first machine-to-machine identifier, the flag being configured to be read by the base station with respect to whether or not to implement local routing.

The process 1400 can further cause the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) to be configured to, when the flag associated with the first machine-to-machine identifier is set, the cause the base station to use the first machine-to-machine identifier for local routing of traffic. When the flag associated with machine-to-machine identifier is not set, the base station can use user plane function-based routing of the traffic.

The process 1400 can further cause the computing system (i.e., the computing system 1500, a first device 702, a second device 704, a gNB or the base station 103, a UPF 708, an AF 710, a PCF 714, a network node 716 that can include the AMF 304 and the SMF 718, a core network node, and/or any combination thereof) to be configured to transmit an initial registration request from the first mobile device to an access and mobility management function indicating that the first mobile device is capable of local routing through the base station. The initial registration request can be received at the access and mobility management function in a non-access stratum (NAS) layer.

In some aspects, a system for accessing local routing of traffic can include at least one processor; and a computer-readable storage medium storing instructions which, when executed by the at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

In another aspect, a system for accessing local routing of traffic can include one or more: means for receiving, from an application function, a first machine-to-machine identifier at a first mobile device being served by a base station; means for adding the first machine-to-machine identifier to a user plane protocol stack of the first mobile device; means for identifying a second machine-to-machine identifier of a second mobile device served by the base station; and means for transmitting, in connection with traffic from the first mobile device to the second mobile device, the second machine-to-machine identifier to the base station to enable local traffic routing through the base station to the second mobile device.

In some aspects, a computer-readable storage medium stores instructions which, when executed by at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

Figure 15:
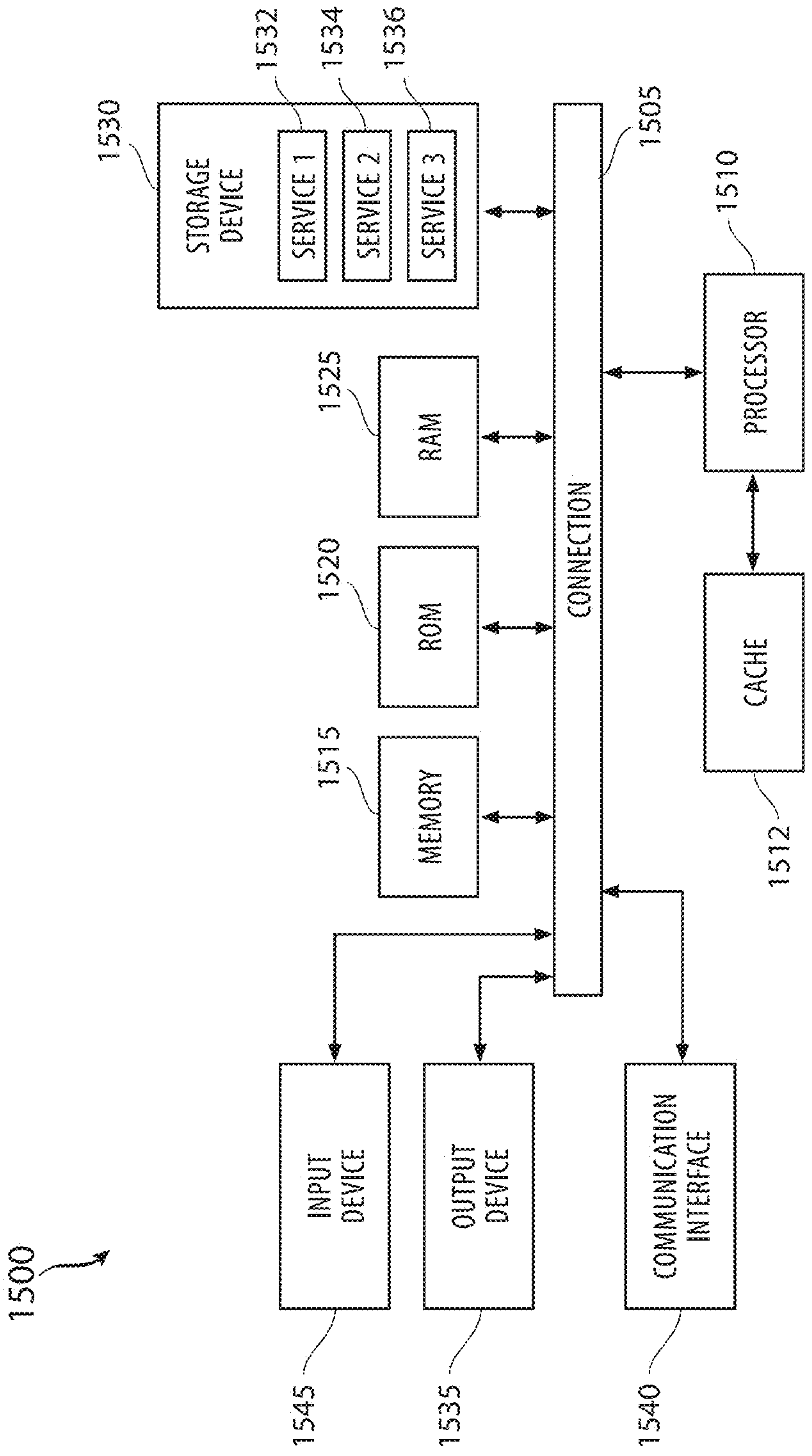
FIG. 15 shows an example of a system for implementing certain aspects of the present technology.

FIG. 15 illustrates an example computing system 1500 includes at least one processing unit (CPU or processor) such as processor 1510 and connection 1505 that couples various system components including system memory 1515, such as read-only memory (e.g., ROM 1520) and random access memory (e.g., RAM 1525) to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some examples, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than (“<”) and greater than (“>”) symbols or terminology used herein can be replaced with less than or equal to (“≤”) and greater than or equal to (“>”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, A and B and C, or any duplicate information or data (e.g., A and A, B and B, C and C, A and A and B, and so on), or any other ordering, duplication, or combination of A, B, and C. The language “at least one of” a set and/or “one or more” of a set does not limit the set to the items listed in the set. For example, claim language reciting “at least one of A and B” or “at least one of A or B” may mean A, B, or A and B, and may additionally include items not listed in the set of A and B. The phrases “at least one” and “one or more” are used interchangeably herein.

Claim language or other language reciting “one or more processors configured to,” “one or more processors being configured to,” “one or more processors configured to,” “one or more processors being configured to,” or the like indicates that one processor or multiple processors (in any combination) can perform the associated operation(s). For example, claim language reciting “one or more processors configured to: X, Y, and Z” means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting “one or more processors configured to: X, Y, and Z” can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include one or more memories, one or more processors, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim clauses for the first embodiment are as follows:

Clause 1. A method comprising: receiving, from an application function, a first machine-to-machine identifier at a first mobile device being served by a base station; adding the first machine-to-machine identifier to a user plane protocol stack of the first mobile device; identifying a second machine-to-machine identifier of a second mobile device served by the base station; and transmitting, in connection with traffic from the first mobile device to the second mobile device, the second machine-to-machine identifier to the base station to enable local traffic routing through the base station to the second mobile device.

Clause 2. The method of clause 1, wherein the first machine-to-machine identifier and the second machine-to-machine identifier are both temporarily assigned by the application function.

Clause 3. The method of clause 1, wherein the application function comprises a core network function and manages use of the first machine-to-machine identifier and the second machine-to-machine identifier to enable local routing through the base station and not through a core network.

Clause 4. The method of clause 3, wherein the first machine-to-machine identifier is configured both in a first user plane protocol stack on the first mobile device and a second user plane protocol stack on the base station.

Clause 5. The method of clause 1, wherein the base station transmits a notice regarding the use of local traffic routing from the base station to a network node for charging purposes.

Clause 6. The method of clause 1, wherein the application function comprises a core network function and wherein the base station comprises a gNB.

Clause 7. The method of clause 1, further comprising: setting a flag associated with first machine-to-machine identifier, the flag being configured to be read by the base station with respect to whether or not to implement local routing.

Clause 8. The method of clause 7, wherein: when the flag associated with the first machine-to-machine identifier is set, the base station uses the first machine-to-machine identifier for local routing of traffic; and when the flag associated with machine-to-machine identifier is not set, the base station uses user plane function-based routing of the traffic.

Clause 9. The method of clause 1, further comprising: transmitting an initial registration request from the first mobile device to an access and mobility management function indicating that the first mobile device is capable of local routing through the base station.

Clause 10. The method of clause 9, wherein the initial registration request is received at the access and mobility management function in a non-access stratum (NAS) layer.

Clause 11. A system for accessing local routing of traffic, the system comprising: at least one processor; and a computer-readable storage medium storing instructions which, when executed by the at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

Clause 12. The system of clause 11, wherein the first machine-to-machine identifier and the second machine-to-machine identifier are both temporarily assigned by the application function.

Clause 13. The system of clause 11, wherein the application function comprises a core network function and manages use of the first machine-to-machine identifier and the second machine-to-machine identifier to enable local routing through the base station and not through a core network.

Clause 14. The system of clause 13, wherein the first machine-to-machine identifier is configured both in a first user plane protocol stack on the first mobile device and a second user plane protocol stack on the base station.

Clause 15. The system of clause 11, wherein the base station transmits a notice regarding the use of local traffic routing from the base station to a network node for charging purposes.

Clause 16. The system of clause 11, wherein the application function comprises a core network function and wherein the base station comprises a gNB.

Clause 17. The system of clause 11, wherein the computer-readable storage medium stores instructions which, when executed by the at least one processor, cause the at least one processor to be configured to: set a flag associated with first machine-to-machine identifier, the flag being configured to be read by the base station with respect to whether or not to implement local routing.

Clause 18. The system of clause 17, wherein: when the flag associated with the first machine-to-machine identifier is set, the base station uses the first machine-to-machine identifier for local routing of traffic; and when the flag associated with machine-to-machine identifier is not set, the base station uses user plane function-based routing of the traffic.

Clause 19. The system of clause 11, further comprising: transmitting an initial registration request from the first mobile device to an access and mobility management function indicating that the first mobile device is capable of local routing through the base station.

Clause 20. The system of clause 19, wherein the initial registration request is received at the access and mobility management function in a non-access stratum (NAS) layer.

Clause 21. A system for accessing local routing of traffic, the system comprising: means for receiving, from an application function, a first machine-to-machine identifier at a first mobile device being served by a base station; means for adding the first machine-to-machine identifier to a user plane protocol stack of the first mobile device; means for identifying a second machine-to-machine identifier of a second mobile device served by the base station; and means for transmitting, in connection with traffic from the first mobile device to the second mobile device, the second machine-to-machine identifier to the base station to enable local traffic routing through the base station to the second mobile device.

Clause 22. A computer-readable storage medium storing instructions which, when executed by at least one processor, cause the at least one processor to be configured to: receive, from an application function, a first machine-to-machine identifier at a first mobile device being served by a base station; add the first machine-to-machine identifier to a user plane protocol stack of the first mobile device; identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

Clause 23. A method comprising: creating, via an application function, a cluster of devices under coverage area of a base station; assigning a respective identifier for each device of the cluster of devices; transmitting the respective identifier for each device to the cluster of devices so that each device of the cluster of devices learns the respective identifier for other devices of the cluster of devices; and routing traffic from a first device of the cluster of devices to a second device of the cluster of devices through the base station based on the respective identifier for each of the first device and the second device.

Clause 24. The method of clause 23, wherein each device of the cluster of devices comprises an Internet-of-Things device.

Clause 25. The method of clause 23, wherein the routing does not route traffic through a user plane function of a mobile core infrastructure system architecture.

Clause 26. The method of clause 25, wherein the respective identifier comprises a machine-to-machine identifier that is configured both in a respective first user plane protocol stack on each device and a second user plane protocol stack on the base station.

Clause 27. The method of clause 23, further comprising: transmitting a notice associated with the routing of the traffic to a network node for charging purposes.

Clause 28. The method of clause 23, wherein the application function comprises a core network function and wherein the base station comprises a gNB.

Clause 29. The method of clause 23, wherein the respective identifier comprises a respective temporary identifier.

Clause 30. The method of clause 23, further comprising: setting a flag associated with machine-to-machine routing when assigning the respective identifier; when the flag associated with machine-to-machine routing is set, using the respective identifier for local routing of traffic; and when the flag associated with machine-to-machine routing is not set, using user plane function-based routing of the traffic.

Clause 31. The method of clause 23, further comprising: receiving a respective initial registration request from each device of the cluster of devices indicating that each device of the cluster of devices is capable of local routing through the base station.

Clause 32. The method of clause 31, wherein the respective initial registration request is received at an access and mobility management function in a non-access stratum (NAS) layer.

Clause 33. A system for providing local routing of traffic, the system comprising: at least one processor; and a computer-readable storage medium storing instructions which, when executed by the at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

Clause 34. The system of clause 33, wherein each device of the cluster of devices comprises an Internet-of-Things device.

Clause 35. The system of clause 33, wherein the routing does not route traffic through a user plane function of a mobile core infrastructure system architecture.

Clause 36. The system of clause 35, wherein the respective identifier comprises a machine-to-machine identifier that is configured both in a respective first user plane protocol stack on each device and a second user plane protocol stack on the base station.

Clause 37. The system of clause 33, wherein the computer-readable storage medium stores instructions which, when executed by the at least one processor, cause the at least one processor to be configured to: receive a notice from the base station regarding the traffic for charging purposes.

Clause 38. The system of clause 33, wherein the application function comprises a core network function and wherein the base station comprises a gNB.

Clause 39. The system of clause 33, wherein the respective identifier comprises a respective temporary identifier.

Clause 40. The system of clause 33, wherein the computer-readable storage medium stores instructions which, when executed by the at least one processor, cause the at least one processor to be configured to: set a flag associated with machine-to-machine routing when assigning the respective identifier; when the flag associated with machine-to-machine routing is set, using the respective identifier for local routing of traffic; and when the flag associated with machine-to-machine routing is not set, using user plane function-based routing of the traffic.

Clause 41. The system of clause 33, wherein the computer-readable storage medium stores instructions which, when executed by the at least one processor, cause the at least one processor to be configured to: receive a respective initial registration request from each device of the cluster of devices indicating that each device of the cluster of devices is capable of local routing through the base station.

Clause 42. The system of clause 41, wherein the respective initial registration request is received at an access and mobility management function in a non-access stratum (NAS) layer.

Clause 43. A system for providing local routing of traffic, the system comprising: means for creating, via an application function, a cluster of devices under coverage area of a base station; means for assigning a respective identifier for each device of the cluster of devices; means for transmitting the respective identifier for each device to the cluster of devices so that each device of the cluster of devices learns the respective identifier for other devices of the cluster of devices; and means for routing traffic from a first device of the cluster of devices to a second device of the cluster of devices through the base station based on the respective identifier for each of the first device and the second device.

Clause 44. A computer-readable storage medium storing instructions which, when executed by at least one processor, cause the at least one processor to be configured to: create, via an application function, a cluster of devices under coverage area of a base station; assign a respective identifier for each device of the cluster of devices; transmit the respective identifier for each device to the cluster of devices so that each device of the cluster of devices learns the respective identifier for other devices of the cluster of devices; and route traffic from a first device of the cluster of devices to a second device of the cluster of devices through the base station based on the respective identifier for each of the first device and the second device.

What is claimed is:

1. A method comprising:

receiving, from an application function, a first machine-to-machine identifier at a first mobile device being served by a base station;

adding the first machine-to-machine identifier to a user plane protocol stack of the first mobile device;

identifying a second machine-to-machine identifier of a second mobile device served by the base station; and transmitting, in connection with traffic from the first mobile device to the second mobile device, the second machine-to-machine identifier to the base station to enable local traffic routing through the base station to the second mobile device.

2. The method of claim 1, wherein the first machine-to-machine identifier and the second machine-to-machine identifier are both temporarily assigned by the application function.

3. The method of claim 1, wherein the application function comprises a core network function and manages use of the first machine-to-machine identifier and the second machine-to-machine identifier to enable local routing through the base station and not through a core network.

4. The method of claim 3, wherein the first machine-to-machine identifier is configured both in a first user plane protocol stack on the first mobile device and a second user plane protocol stack on the base station.

5. The method of claim 1, wherein the base station transmits a notice regarding use of local traffic routing from the base station to a network node for charging purposes.

6. The method of claim 1, wherein the application function comprises a core network function and wherein the base station comprises a gNB.

7. The method of claim 1, further comprising:

setting a flag associated with first machine-to-machine identifier, the flag being configured to be read by the base station with respect to whether or not to implement local routing.

8. The method of claim 7, wherein:

when the flag associated with the first machine-to-machine identifier is set, the base station uses the first machine-to-machine identifier for local routing of traffic; and when the flag associated with machine-to-machine identifier is not set, the base station uses user plane function-based routing of the traffic.

9. The method of claim 1, further comprising:

transmitting an initial registration request from the first mobile device to an access and mobility management function indicating that the first mobile device is capable of local routing through the base station.

10. The method of claim 9, wherein the initial registration request is received at the access and mobility management function in a non-access stratum (NAS) layer.

11. A system for accessing local routing of traffic, the system comprising:

at least one processor; and a computer-readable storage medium storing instructions which, when executed by the at least one processor, cause the at least one processor to be configured to:

receive, from an application function, a first machine-to-machine identifier at a first mobile device being served by a base station;

add the first machine-to-machine identifier to a user plane protocol stack of the first mobile device;

identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

12. The system of claim 11, wherein the first machine-to-machine identifier and the second machine-to-machine identifier are both temporarily assigned by the application function.

13. The system of claim 11, wherein the application function comprises a core network function and manages use of the first machine-to-machine identifier and the second machine-to-machine identifier to enable local routing through the base station and not through a core network.

14. The system of claim 13, wherein the first machine-to-machine identifier is configured both in a first user plane protocol stack on the first mobile device and a second user plane protocol stack on the base station.

15. The system of claim 11, wherein the base station transmits a notice regarding use of local traffic routing from the base station to a network node for charging purposes.

16. The system of claim 11, wherein the application function comprises a core network function and wherein the base station comprises a gNB.

17. The system of claim 11, wherein the computer-readable storage medium stores instructions which, when executed by the at least one processor, cause the at least one processor to be configured to:

set a flag associated with first machine-to-machine identifier, the flag being configured to be read by the base station with respect to whether or not to implement local routing.

18. The system of claim 17, wherein:

when the flag associated with the first machine-to-machine identifier is set, the base station uses the first machine-to-machine identifier for local routing of traffic; and when the flag associated with machine-to-machine identifier is not set, the base station uses user plane function-based routing of the traffic.

19. The system of claim 11, further comprising:

transmitting an initial registration request from the first mobile device to an access and mobility management function indicating that the first mobile device is capable of local routing through the base station, wherein the initial registration request is received at the access and mobility management function in a non-access stratum (NAS) layer.

20. A computer-readable storage medium storing instructions which, when executed by at least one processor, cause the at least one processor to be configured to:

receive, from an application function, a first machine-to-machine identifier at a first mobile device being served by a base station;

add the first machine-to-machine identifier to a user plane protocol stack of the first mobile device;

identify a second machine-to-machine identifier of a second mobile device served by the base station; and transmit, in connection with traffic from the first mobile device to the second mobile device, the second machine-to-machine identifier to the base station to enable local traffic routing through the base station to the second mobile device.

* * * * *